G. W. MICKEL.
WATER MOTOR.
APPLICATION FILED MAY 24, 1910.

1,058,776.

Patented Apr. 15, 1913.

2 SHEETS—SHEET 1.

Witnesses
H. N. Lybrand
James E. Roehl

Inventor
George W. Mickel
By Victor J. Evans
Attorney

G. W. MICKEL.
WATER MOTOR.
APPLICATION FILED MAY 24, 1910.
1,058,776.
Patented Apr. 15, 1913.
2 SHEETS—SHEET 2.
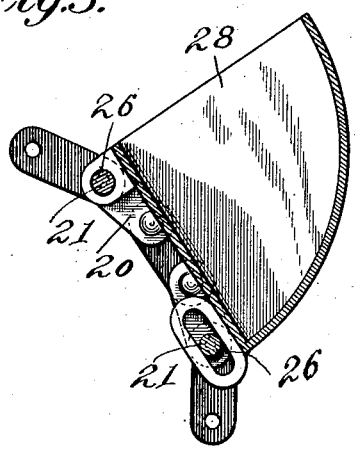
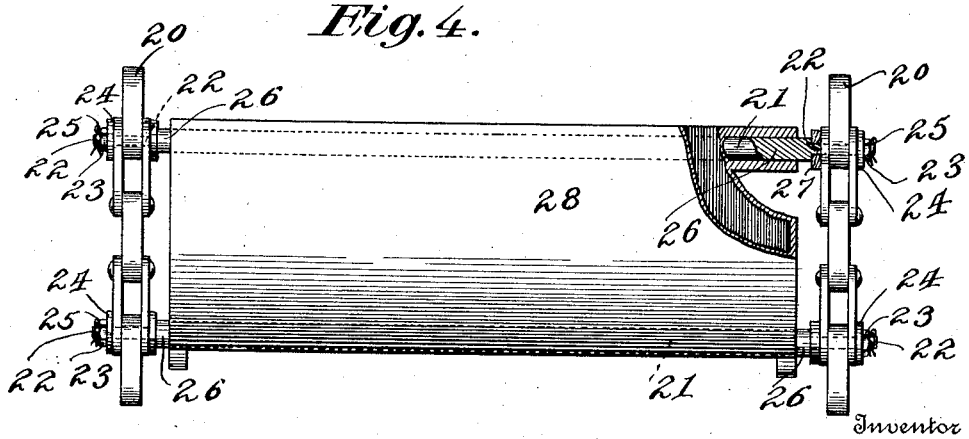
Witnesses
Inventor
George W. Mickel
By Victor J. Evans
Attorney

UNITED STATES PATENT OFFICE.

GEORGE W. MICKEL, OF SALT LAKE CITY, UTAH.

WATER-MOTOR.

1,058,776.  Specification of Letters Patent.  Patented Apr. 15, 1913.

Application filed May 24, 1910. Serial No. 563,171.

*To all whom it may concern:*

Be it known that I, GEORGE W. MICKEL, a citizen of the United States of America, residing at Salt Lake City, in the county of Salt Lake and State of Utah, have invented new and useful Improvements in Water-Motors, of which the following is a specification.

This invention relates to water motors, and it has for an object to provide a simple and highly efficient structure of this character whereby a great amount of power can be quickly developed.

A still further object of the invention is to provide a driven shaft on which is supported large sprocket gear wheels for sustaining the full weight of the buckets of the overshot chain, causing a full force of the weight to be applied directly to the said driven shaft.

Figure 1:
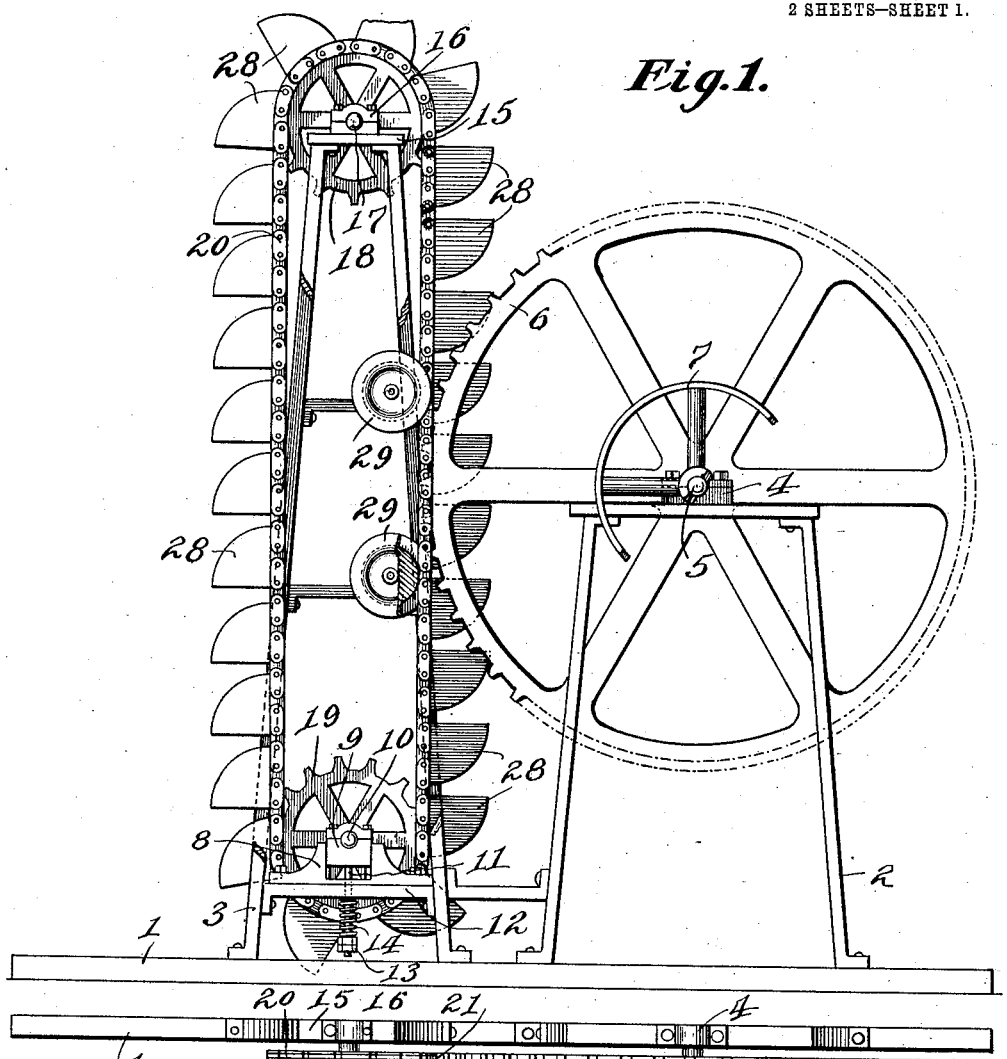
Figure 2:
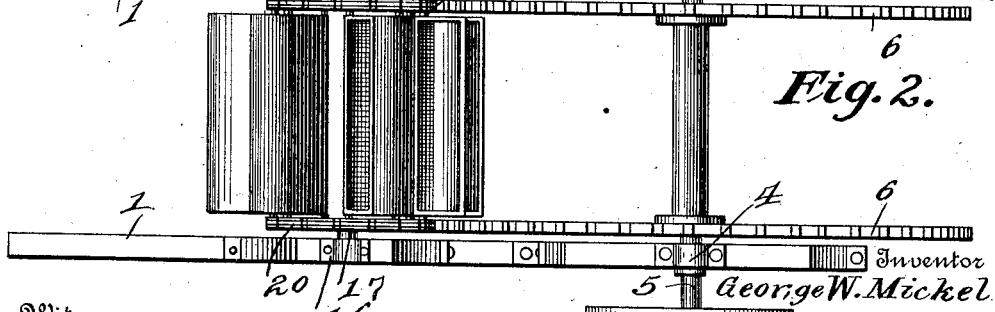

In the drawings, forming a portion of this specification and in which like numerals of reference indicate similar parts in the several views:—Figure 1 is a side elevation of my improved water motor. Fig. 2 is a top plan view thereof. Fig. 3 is a detail end view of the bucket-carrying belt showing one of the driven gears operatively associated therewith. Fig. 4 is a detail vertical section through a portion of the chain showing the manner of connecting the buckets therewith.

My improved water motor consists of a base or platform 1 on which is supported a frame 2 and a frame 3. The frame 2 is provided with suitable bearings 4 which may be of any well known approved design, and as illustrated, a driven shaft 5 is journaled in such bearings and it supports relatively large sprocket gear wheels 6 which are spaced from each other for a purpose to be hereinafter described. One end of the said shaft extends beyond its bearing and secured to such end is a pulley wheel 7 which may be belted or suitably geared to the motor to be run by my improved apparatus.

The frame 3 supports a pair of horizontally disposed members 8 in which the bearings 9 of the shaft 10 are yieldingly supported, the said bearings 9 being provided with depending stems 11 which extend through the portion 12 of the frame 3. These stems are formed at their lower ends to provide stops or heads 13 and as illustrated, the said stems are surrounded by extensile springs 14 being confined between the part 12 of the frame and the heads 13 of the stems. Under tension of the springs 14 a downward pressure is exerted on the bearings 9 for a purpose to be hereinafter referred to.

The top part 15 of the frame 3 supports spaced bearings 16 for the shaft 17. This shaft is disposed immediately above the shaft 10 and it is provided with relatively small sprocket gear wheels 18 which are located immediately above similar sprocket gear wheels 19 on the shaft 10. The gear wheels just described are operatively connected with each other by spaced chains 20 which are connected with each other by rods 21. These rods are provided with reduced end portions 22 which fit the links of the chains as shown particularly in Fig. 5 of the drawings. The end portions of the parts 22 of the rods are threaded for the reception of nuts 23, and as shown, the said parts 22 are provided on the inner sides of the nuts with suitable washers 24. Suitable pins or keys 25 extend through the extremities of the reduced portions 22 of the rods to hold the nuts against accidental displacement as will be understood. The rods 21 are provided with intermediate enlarged portions 26 which form shoulders at the inner ends of the reduced portions 22 of the rods against which the washers 27 are seated. These washers bear against the inner links of the chains 20 and they serve with the outer washers 24 to hold the chains operatively engaged with the sprocket gear wheels 18 and 19.

The portions 26 of the rods support buckets 28 which may be of any well known design. These buckets extend over two or more links and have at their upper inside corners apertured lugs 30 which form a bearing for the rod 21, and at the lower edge lugs 31 having longitudinal slots therein permitting the rod passing through them to slide free thus affording an adjustment for the bucket. The buckets 28 and the chains 20 form in their entirety a structure similar to the well known overshot wheels and they are arranged to receive the water from any suitable source of supply (not shown), so that the weight of the water will revolve the shafts 10 and 17, it being understood that the water is carried downwardly in the buckets at one side of the chains and discharged at a point approximately beneath the lowermost shaft 10. The sprocket gears 6 mesh with the chains 20 so that the full force of the load on the chains is applied directly to such wheels.

The frame 3 supports suitable idler wheels 29 which bear against the chains to hold their links operatively associated with the gear wheels 6.

In view of the construction of the bearings 9 it will be seen that the chains 20 are under such tension that they will be held against displacement from their sprocket gear wheels.

In view of the construction of the apparatus described it will be seen that the large sprocket gear wheels support on their peripheral surfaces the full force of the load or the weight of the water thereby increasing the efficiency of such apparatus and greatly increasing the power of the driven shaft and retain the speed with any desired given flow of water.

I claim:

1. In a water motor, a frame, shafts supported by the frame, sprocket wheels mounted on the shafts, chains operating over the sprocket wheels, buckets having one end movably connected with the chains, apertured lugs at the top of the buckets, a rod extending through the apertured lugs and means for operating the said chain.

2. In a water motor, a frame, shafts supported by the frame, sprocket wheels mounted on the shafts, chains operating on the sprocket wheels, buckets having one end movably connected with the chain, each of the buckets extending over several links in the chain, apertured lugs at the top of the buckets, a rod extending through the apertured lugs, slotted lugs at the bottom of the buckets, a rod extending through the slots and slidable therein and means for operating the said chain.

In testimony whereof I affix my signature in presence of two witnesses.

GEORGE W. MICKEL.

Witnesses:
Wm. Atwood,
A. T. McCarty.

---

Copies of this patent may be obtained for five cents each, by addressing the "Commissioner of Patents, Washington, D. C."